A. HOLLINGS.
Filters.

No. 148,561. Patented March 17, 1874.

Witnesses.
Joseph L. Wicks,
Richard Driver.

Inventor,
Alfred Hollings.

UNITED STATES PATENT OFFICE.

ALFRED HOLLINGS, OF PROVIDENCE, RHODE ISLAND.

IMPROVEMENT IN FILTERS.

Specification forming part of Letters Patent No. 148,561, dated March 17, 1874; application filed August 18, 1873.

*To all whom it may concern:*

Be it known that I, ALFRED HOLLINGS, of the city and county of Providence, State of Rhode Island, have invented an Improved Filter, of which the following is a specification:

The object of my invention is to construct a cheap, quick, and efficient filter for filtering large quantities of magma, or mixture obtained in chemically treating the waste-water of woolen, worsted, or other manufactories, in order to utilize the oil or fatty matter contained therein.

In the accompanying drawing, like letters indicate like parts.

Figure 1:
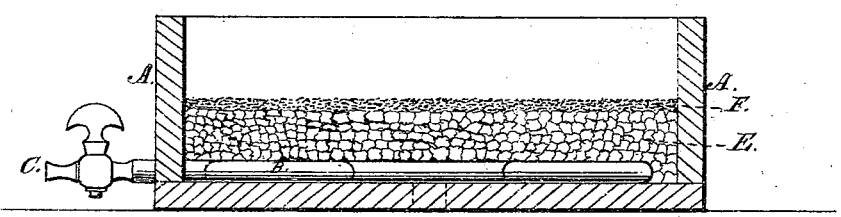
Figure 2:
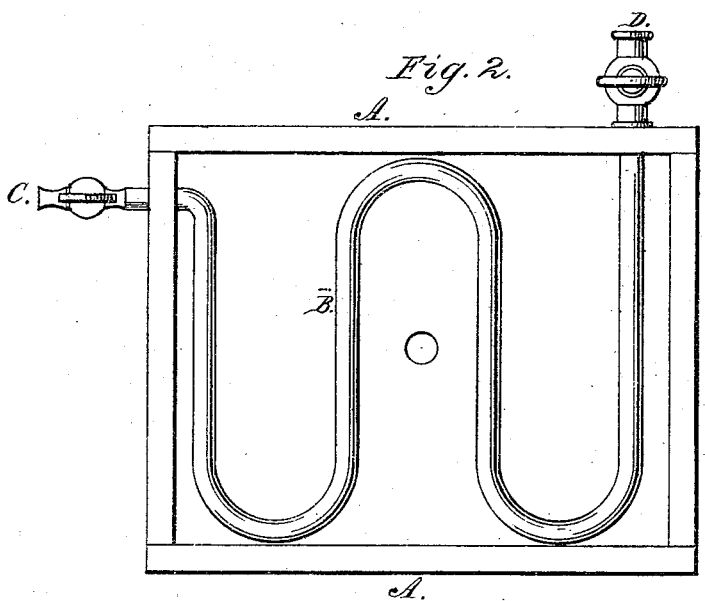

Figure 1 is an elevation of my invention. Fig. 2 is a ground plan of the same.

In the drawing, A A represent a box or cistern, of any required size and depth, in the bottom of which I make suitable holes to let out the water. This cistern is best made of wood; but where the ground is hard and firm, it might be constructed by simply excavating a trench of the required size in the ground, providing proper drains in the bottom for the escape of the water. Into this cistern I place a coil of steam-pipe, B B, provided with a valve or inlet for steam at C, and valve or outlet for condensed water at D. Over this coil of pipe I put in a thick layer of small stones or pebbles, E, over which I place a thin layer of sawdust, F, on the top of which I place the magma or mixture requiring filtering. The heat from the steam assists the rapid escape of the water, especially in cold weather, being then absolutely necessary, while the sawdust effectually prevents the smallest particle of magma being wasted. A small quantity of the sawdust is unavoidably removed with the magma at each removal; but this assists at the next process to which the magma is subjected.

I am aware that filters are in use for chemical purposes; but these are generally made of cocoa or hair matting, canvas, or linen, and which, from the nature of the materials employed, are very expensive, slow filters, as well as inconvenient for the removal of the magma.

What I claim as my invention, and desire to secure by Letters Patent, is—

The construction of a filter heated by steam, with lining of stones and sawdust, in the manner substantially as described, as and for the purpose specified.

ALFRED HOLLINGS.

Witnesses:
 J. F. WICKS,
 RICHARD DRIVER.